(12) United States Patent
Cristani et al.

(10) Patent No.: US 10,893,594 B2
(45) Date of Patent: Jan. 12, 2021

(54) METHOD OF IDENTIFYING LIGHT SOURCES AND A CORRESPONDING SYSTEM AND PRODUCT

(71) Applicants: OSRAM GmbH, Munich (DE); Fondazione Istituto Italiano di Tecnologia, Genoa (IT); Università degli Studi di Verona, Verona (IT)

(72) Inventors: Marco Cristani, Verona (IT); Alessio Del Bue, Genoa (IT); Michael Eschey, Wehringen (DE); Fabio Galasso, Garching (DE); Irtiza Hasan, Gujranwala (PK); Herbert Kaestle, Traunstein (DE); Theodore Tsesmelis, Loutra-Mytilene (GR)

(73) Assignees: Osram GmbH, Munich (DE); Fondazione Istituto Italiano di Tecnologia, Genoa (IT); Université degli Studi di Verona, Verona (IT)

( * ) Notice: Subject to any disclaimer, the term of this patent is extended or adjusted under 35 U.S.C. 154(b) by 0 days.

(21) Appl. No.: 16/341,465

(22) PCT Filed: Oct. 10, 2017

(86) PCT No.: PCT/IB2017/056246
§ 371 (c)(1),
(2) Date: Apr. 12, 2019

(87) PCT Pub. No.: WO2018/069827
PCT Pub. Date: Apr. 19, 2018

(65) Prior Publication Data
US 2019/0373704 A1    Dec. 5, 2019

(30) Foreign Application Priority Data

Oct. 13, 2016 (IT) .................. 102016000103146

(51) Int. Cl.
*H05B 47/105* (2020.01)
*G06T 7/00* (2017.01)
(Continued)

(52) U.S. Cl.
CPC .......... *H05B 47/105* (2020.01); *G01J 1/0228* (2013.01); *G01J 1/4204* (2013.01);
(Continued)

(58) Field of Classification Search
CPC .................. G01J 1/4204; G01J 1/0228; G01J 2001/4247; G01J 1/0266; G06T 7/97;
(Continued)

(56) References Cited

U.S. PATENT DOCUMENTS

| 7,502,034 B2* | 3/2009 | Chemel | H05B 47/155 345/594 |
| 2012/0286670 A1* | 11/2012 | Van Herk | H05B 47/155 315/151 |

(Continued)

FOREIGN PATENT DOCUMENTS

GB    2418482 A    3/2006

OTHER PUBLICATIONS

Alhajhamad, H. et al.: "Automatic Estimation of Illumination Features for Indoor Photorealistic Rendering in Augmented Reality", Springer International Publishing, Cham; 15 pages.
(Continued)

*Primary Examiner* — Renan Luque
(74) *Attorney, Agent, or Firm* — Viering, Jentschura & Partner MBB

(57) ABSTRACT

A lighting system including a set of lighting devices for lighting an environment that may be controlled by a method. The method may include receiving, from one or more image sensors (e.g. a RGB-D camera—W), an image signal including a sequence of images of the environment under different
(Continued)

conditions of illumination and light reflection. The method may further include processing the image signal to provide a light source identification signal representative of light sources affecting the environment, and controlling the lighting devices as a function of the light source identification signal, and, possibly, of human occupancy and activity.

10 Claims, 3 Drawing Sheets

(51) Int. Cl.
    *G01J 1/02*         (2006.01)
    *G01J 1/42*         (2006.01)
(52) U.S. Cl.
    CPC ......... *G06T 7/97* (2017.01); *G01J 2001/4247* (2013.01); *G06T 2207/10016* (2013.01); *G06T 2207/10152* (2013.01); *G06T 2207/30242* (2013.01)
(58) Field of Classification Search
    CPC . G06T 2207/30242; G06T 2207/10152; G06T 2207/10016; G06T 7/70; G06T 15/50; G06T 2207/10028; G06K 9/4661; Y02B 20/48; H05B 47/105; H05B 47/115; H05B 47/125; H05B 47/135; H05B 47/155
    See application file for complete search history.

(56) References Cited

U.S. PATENT DOCUMENTS

| | | | |
|---|---|---|---|
| 2015/0043806 A1* | 2/2015 | Karsch | G06T 15/50 382/154 |
| 2015/0076992 A1* | 3/2015 | Walma | H05B 47/11 315/153 |
| 2015/0146931 A1 | 5/2015 | Maricic et al. | |
| 2016/0163057 A1* | 6/2016 | Rowley | G06T 15/506 348/46 |
| 2017/0061253 A1* | 3/2017 | Burgos | G06T 7/70 |

OTHER PUBLICATIONS

Plopski, A. et al.: "Reflectance and light source estimation for indoor AR applications". In: IEEE Virtual Reality (VR); 2014; 103-104; Minneapolis, Minnesota, USA.
Boom, B. et al.: "Interactive light source position estimation for augmented reality with an RGB-D camera". Computer Animation and Virtual Worlds; 16 pages.
Neverova, N. et al.: "Lighting Estimation in Indoor Environments from Low-Quality Images"; Springer International Publishing; European Conference on Computer Vision; 10 pages.
Debevec, P.: "Image-based lighting"; In: IEEE Computer Graphics and Applications; vol. 22; No. 2; Mar.-Apr. 2002; pp. 26-34.
Karsch, K. et al.: "Rendering synthetic objects into legacy photographs"; ACM Transactions on Graphics 30(6) (Dec. 2011); 12 pages.
Takai, T. et al.: "Difference sphere: An approach to near light source estimation"; Computer Vision Image Understanding 113(9) (Sep. 2009); 8 pages.
Ogura, Y. et al.: "Illumination estimation and relighting using an RGB-D camera". Proceedings of the 10th International Conference on Computer Vision Theory and Applications; 305-312; Berlin; Germany.
Poulin, P. et al.: "Lights from highlights and shadows"; In: Proceedings of the 1992 Symposium on Interactive 3D Graphics, 9 pages; 1992; Cambridge; Massachusetts; USA.
Wang, Y. et al.: "Estimation of multiple directional light sources for synthesis of augmented reality images". Graphical Models—Special issue on Pacific graphics 2002; vol. 65; No. 4, 10 pages.
Hara, K. et al.: "Light source position and reflectance estimation from a single view without the distant illumination assumption"; IEEE Transactions on Pattern Analysis and Machine Intelligence 27(4); Apr. 2005; 493-505.
Lopez-Moreno, J. et al: "Compositing images through light source detection"; Computers & Graphics; 34(6); 2010; 10 pages.
Gijsenij, A. et al.: "Computational color constancy: Survey and experiments"; IEEE Transactions on Image Processing; 20(9); Sep. 2011; 2475-2489.
Beigpour, S. et al.: "Multi-illuminant estimation with conditional random fields"; IEEE Transactions on Image Processing (TIP); 23(1); Jan. 2014; 14 pages.
Stutz, D. et al.: "Intrinsic images introduction and reading list"; available at http://davidstutz.de/intrinsic-images-introduction-and-reading-list/ (accessed: Feb. 2015).
Land, E. et al.: "Lightness and retinex theory"; Journal of the Optical Society of America; 61(1); Jan. 1971; 1-11.
Barron, J. et al.: "Intrinsic scene properties from a single RGB-D image"; IEEE Conference on Computer Vision and Pattern Recognition; Jun. 2013; pp. 17-24.
Chen, Q. et al.: "A simple model for intrinsic image decomposition with depth cues"; In: 2013 IEEE International Conference on Computer Vision. (Dec. 2013) 241-248.
Shi, J. et al.: "Efficient intrinsic image decomposition for RGBD images"; In: Proceedings of the 21st ACM Symposium on Virtual Reality Software and Technology; VRST '15; Nov. 2015; 17-25; Beijing; China.
Barron, J. et al.: "Shape, illumination, and reflectance from shading"; IEEE Transactions on Pattern Analysis and Machine Intelligence, vol. 37, No. 8; Aug. 2015; 19 pages.
Laffont, P. et al.: "Intrinsic decomposition of image sequences from local temporal variations"; In: Proceedings of the International Conference on Computer Vision (ICCV); Dec. 2015; pp. 433-441.
Meka, A. et al.: "Live intrinsic video"; ACM Transactions on Graphics (Proceedings SIGGRAPH); 35(4); Jul. 2016; 14 pages.
Bonneel, N. et al.: Interactive intrinsic video editing. ACM Transactions on Graphics (Proceedings of SIGGRAPH Asia; 2014); 33(6); Nov. 2014; 11 pages; retrieved from https://hal.archives-ouvertes.fr/hal-01264124/document.
Ye, G. et al.: "Intrinsic video and applications"; ACM Transactions on Graphics; 33(4); Jul. 2014; 11 pages.
Lellmann, J. et al.: "Shape from specular reflection and optical flow"; International Journal of Computer Vision; 80 (2); 2008; 226-241.
Tan, R. et al.: "Separating Reflection Components of Textured Surfaces using a Single Image"; IEEE Transactions on Pattern Analysis and Machine Intelligence; 27(2); Feb. 2005.
Yang, Q, et al.: "Real-time specular highlight removal using bilateral filtering"; In: Proceedings of the 11th European Conference on Computer Vision: Part IV; Sep. 2010; 14 pages; Heraklion, Crete, Greece.
Shen, H. et al.: "Real-time highlight removal using intensity ratio"; Appl. Opt. 52(19); Jul. 2013; 4483-4493.
Kaist, H. et al.: "Specular reflection separation using dark channel prior"; In: Proceedings of the 2013 IEEE Conference on Computer Vision and Pattern Recognition. IEEE International Conference on Computer Vision 2013; Jun. 2013; 1460-1467; Portland; OR; USA.
Akashi, Y. et al.: "Separation of Reflection Components by Sparse Non-negative Matrix Factorization"; Computer Vision and Image Understanding; vol. 146; Sep. 2015; 77-85; retrieved from https://www.sciencedirect.com/science/article/pii/S1077314215001873.
An, D. et al.: "Fast and high quality highlight removal from a single image"; IEEE Transactions on Image Processing; vol. 25; No. 11; Nov. 2016; 11 pages.
Zhao, Y. et al.: "Specular reflection removal using local structural similarity and chromaticity consistency"; In: 2015 IEEE International Conference on Image Processing (ICIP); Sep. 2015 3397-3401.

(56) References Cited

OTHER PUBLICATIONS

PCO: Knowledge base: linearity. https://www.pco.de/fileadmin/user_upload/db/download/kb_linearity_20100727.pdf [Online; accessed Jul. 10, 2016].
Lee, D. et al.: "Learning the parts of objects by non-negative matrix factorization"; Nature 401; 1999; 788-791.
Gillis, N. et al.: "Using underapproximations for sparse nonnegative matrix factorization"; Pattern Recogn.; 43(4); Apr. 2010; 24 pages.
Casalino G: et al.: "Sequential dimensionality reduction for extracting localized features", Pattern Recogn., vol. 63; Mar. 2017; 24 pages.
International Search Report based on PCT Application PCT/IB2017/056246 dated Dec. 1, 2017, 14 pages (for reference purpose only).
Neverova et al.: "Lighting Estimation in Indoor Environments from Low-Quality Images", Oct. 7, 2012, Computer Vision ECCV. Workshops and Demonstrations, Springer Berlin Heidelberg, Berlin, Heidelberg, pp. 380-389.
Casalino et al.: "Sequential dimensionality reduction for extracting localiyed features", Pattern Recognition., vol. 63, Sep. 19, 2016, pp. 15-29.

\* cited by examiner

METHOD OF IDENTIFYING LIGHT SOURCES AND A CORRESPONDING SYSTEM AND PRODUCT

CROSS-REFERENCE TO RELATED APPLICATIONS

The present application is a national stage entry according to 35 U.S.C. § 371 of PCT Application No. PCT/IB2017/056246 filed on Oct. 10, 2017, which claims priority to Italian Patent Application No. 102016000103146, filed on Oct. 13, 2016; both of which are herein incorporated by reference in their entirety.

TECHNICAL FIELD

The description relates to lighting systems.

One or more embodiments may be applied to controlling "smart" lighting systems for lighting e.g. an indoor environment by identifying the light sources affecting such an environment.

Throughout this description, various documents will be referred to by reproducing between square parentheses (e.g. [X]) a number identifying the document in a LIST OF DOCUMENTS CITED which appears at the end of the description.

TECHNOLOGICAL BACKGROUND

Lighting systems including several lighting devices are commonly used in a number of applications (offices, homes, hospitals, warehouses etc.).

Manually commissioning such lighting systems may involve controlling light management systems and/or finely tuning lighting levels according to lighting sensors (luxmeters), in agreement with system specifications.

Manual setup may thus be cumbersome, may require expert knowledge and may need to be repeated any time one of the light sources changes, either in terms of light source model or in terms of its position.

Automatic calibration of lighting system by measuring the prevailing illumination may be preferred over manual commissioning with specific equipment.

Automatic calibration may be difficult, e.g. due to the complex physical interactions between the 3D geometry of the scene, the surface materials and the light characteristics of natural and artificial sources.

Existing solutions mainly focus on augmented reality applications [1] [2] [3] [4], by paying less attention to real life environments.

Moreover, certain solutions require complex hardware equipment and setup e.g. with high dynamics/resolution cameras and the use of light probes [5] and/or user input for the geometrical structure of the scene, object interactions and rough positions and colours of the light sources [6].

Prior art techniques for light analysis in computer vision address specific problems (e.g. illumination estimation, light sources estimation/localization, intrinsic image decomposition, specular highlights detection and removal, etc. . . . ) individually without considering the scope of a complete system.

Light estimation is one of the most challenging problems in computer vision and computer graphics. This may apply e.g. to indoor environments, where multiple light sources of different types (e.g. artificial, natural), sizes, shapes and spectral characteristics may be present.

Various prior art solutions assume known variables in the scene (e.g. geometry) or may exploit user input and helpful objects (e.g. light probes) in addition to complex equipment for estimating one or multiple unknown variables.

The solution disclosed in [5] uses high level equipment in addition to light probes, while interesting results are achieved in [7] by using reference spheres and a near light assumption.

The solution of [6] exploits light estimation and correction through a rendering-based optimization procedure, with the user specifying beforehand certain unknown variables (e.g. geometry, position and colour of light sources).

A rendering-based approach is also followed in [3] and [4] coupled with depth information; this approach may result in a time consuming solution, limited to a small number of light sources. Depth information and inverse rendering are also used in [8] for illumination estimation and relighting.

The approaches described in [9] and [10] estimate illumination by taking advantage of shadows cast and specular reflection of known geometries in the scene. Extensions of these latter solutions are introduced in [11], by assuming different reflectance models.

Lopez Moreno et al. [12] use an object silhouette, provided by user input, to estimate multiple light sources from a single image.

Computational colour constancy is a field with main focus on the colour of the light source, which however may also require estimation of the light direction [13] [14].

Another approach oftentimes used with light estimation is intrinsic image decomposition [15], where the colour of each pixel is decomposed into reflectance and shading.

This may be helpful in extracting colour and lighting properties of materials within the scene and have a better understanding thereof.

Land and McCann [16] proposed in 1975 the Retinex theory by assuming that albedo is characterized by sharp edges while shading tends to vary slowly.

More recent works tried to improve decomposition and acquire useful information regarding the illumination of the scene illumination.

For instance [17],[18], [19] try to decompose a RGB-D input into reflectance and shading components in order to explain the scene and extract an illuminant estimation.

Other works estimate shape, chromatic illumination, reflectance, and shading from a single image [20] or a global reflectance layer from a sequence of images [21] which may allow to obtain a shading layer from each image respectively.

In recent times, attention has been extensively paid to real time decomposition [19], [22], [23], [24] allowing applications to take advantage therefrom for different uses, such as re-colouring, material editing and retexturing.

Most intrinsic image decomposition methods assume diffuse reflection and neglect specular highlight hotspots.

A specular component may be used for example for illumination estimation [9] or for shape retrieval from specular reflection [25].

For instance, Tan and Ikeuchi et al. [26] made use of the difference between specular and diffuse pixels in order to remove highlight effects.

In order to reduce the high computational cost of the related searching strategy, Yang et al. [27] introduced the use of bilateral filtering, while Shen and Zheng [28] proposed to adopt a specular-independent material clustering approach and relate then the specular intensity to its specular free counterpart.

Kim et al. [29] bear witness to attempts at separating the specular reflection by using first a dark channel and then an optimization problem based on the observation that for most natural images the dark channel can provide an approximate specular-free image.

An optimization solving method is also proposed [30], by formulating the problem of separating the two components as a non-negative matrix factorization (NMF) problem.

In [31] the authors propose an approach based on an L2 chromaticity definition and a corresponding dichromatic model, while a more recent work [32] estimates the diffuse component by solving a local structure and chromaticity joint compensation problem.

At present smart lighting sensor-based systems can provide different information, primarily the presence of people.

Exemplary of such systems are certain industrial light management systems based on the Dali or KNX standards which employ Passive InfraRed sensors (PIRs) mainly for movement detection.

OBJECT AND SUMMARY

An object of one or more embodiments is to contribute in providing further improvements in the area of technology discussed in the foregoing by overcoming various drawbacks of the solutions discussed in the foregoing.

According to one or more embodiments, such an object may be achieved by means of a method as set forth in the claims that follow.

One or more embodiments may relate to a corresponding system, as well as to a computer program product loadable in the memory of at least one processing module (that is, a computer) and including software code portions for executing the steps of the method when the product is run on at least one processing module.

As used herein, reference to such a computer program product is understood as being equivalent to reference to a computer-readable means containing instructions for controlling the processing system in order to co-ordinate implementation of the method according to one or more embodiments.

Reference to "at least one computer" is intended to highlight the possibility for one or more embodiments to be implemented in modular and/or distributed form.

The claims are an integral part of the disclosure provided herein in relation to the one or more embodiments.

One or more embodiments may provide an automatic or semi-automatic technique to calibrate the position and current illumination pattern of light sources, e.g. by exploiting an image sequence acquired by a camera over a certain observation period.

In one or more embodiments, such an observation period may be a long-term observation period, e.g. an observation period long enough to capture sufficient lighting variations in the environment, e.g. over a day-and-night cycle.

One or more embodiments may involve analysing a light(ing) pattern in e.g. indoor environments and providing information about what light sources are active by using (only) images obtained from a camera.

One or more embodiments may provide a simple control system consisting essentially of an RGB-D (color image+depth) camera and a processing unit.

One or more embodiments may automatically and robustly identify lights in an unknown environment with arbitrary light source type and position (including natural lights).

One or more embodiments may provide a system which may exploit computer vision solutions, targeting a fully automatic tool for calibration via a long-term observation (i.e. time lapse) with a RGB-D sensing device (i.e. a color camera and depth sensor) and its integration into a smart lighting management system.

In one or more embodiments, "top-view" time lapse images of a scene/indoor area may be analyzed through a pipeline structured from a combination of computer vision procedures in order to:

estimate the number of light sources within a scene (i.e. light sources estimation), determine/match the presence of light sources within the scene.

One or more embodiments may provide a real time solution without user intervention, based on easily available equipment and capable of taking into account a large number of light sources (natural and artificial) without restrictions.

One or more embodiments may provide a better illumination modelling of a scene using as an input intrinsic images in the place of common RGB/grayscale images.

In one or more embodiments, light sources can be both natural (e.g. sunlight from a window) and artificial, thus providing a solution that can self-adapt to different environments.

In one or more embodiments, a system may first record a series of images with prominent light variations (e.g. over long-term observations, such as a night-and-day cycle) and then decompose such sequence into a set of base images, depicting each light source alone; these images may be further used to identify a light source (incl. natural light sources) in each new image acquired by system.

It was observed that, in addition to providing a better knowledge of the scene (e.g. localization of light sources and light propagation and illumination estimation) such information can be exploited in order to facilitate "smart" management of lighting systems, such as those using electrically-powered light radiation sources (e.g. solid-state lighting sources such as LED sources), in order to provide e.g.

switching off lights in those areas which are not visible for people;

adjusting the illumination/brightness strength e.g. in relation to the predicted activities;

activating/deactivating lights in relation to the predicted activities.

One or more embodiments may thus provide light management systems that may implement e.g. a sort of "invisible light switch": users have the feeling of living in an all-lit environment, while the environment is only minimally lit, therefore providing a notable energy saving "in the invisible".

A concept underlying such an invisible light switch approach is straightforward: the user controls and sets the illumination of the environment that he or she can see, while a system according to one or more embodiments may act on a part of the environment that the user cannot see, turning off the lights, thus ensuring a consistent energy saving.

In one or more embodiments, analyzing the scene may aim at becoming aware of the 3D geometry of the scene and mapping inter-reflectance, thus making it possible to understand how different light sources impact each point of the space.

One or more embodiments may involve the recognition that, in order to overcome the presence of specular highlights, a pre-processing step may be beneficial in separating specular and diffuse components with intrinsic image decomposition then applied on the diffuse component.

Thus, separating specular from diffuse component from the images of non-Lambertian scenes may be helpful, e.g. for refining images before using them for intrinsic decomposition.

BRIEF DESCRIPTION OF THE FIGURES

One or more embodiments will now be described, by way of example only, with reference to the annexed figures, wherein.

DETAILED DESCRIPTION

In the following one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 5:
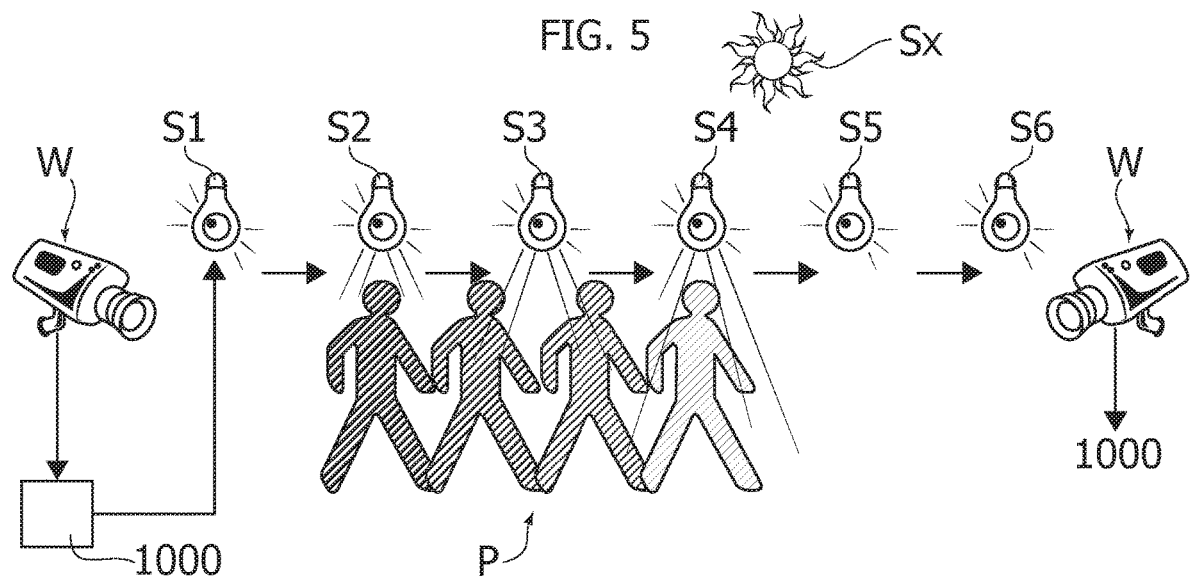

One or more embodiments may apply to a lighting system as schematically represented in FIG. 5, namely a system including a set of lighting devices S1, . . . , S6 for lighting an environment (e.g. an indoor environment).

In one or more embodiments the lighting devices S1, . . . , S6 may include electrically-powered lighting devices e.g. solid-state lighting sources (SSL), such as LED sources.

In one or more embodiments, such a system may include:
one or more image sensors W, e.g. one or more RGB-D cameras, which may provide (possibly jointly) a sequence of images of the environment under different conditions of illumination and light reflection, and
a control module 1000 (e.g. a processing unit such as DSP) configured for receiving an environment image signal from the image sensor(s) W and processing that signal with the capability of controlling the lighting devices S1, . . . , S6 as a function of the signal from the image sensor(s) W e.g. as discussed in the following.

Figure 1:
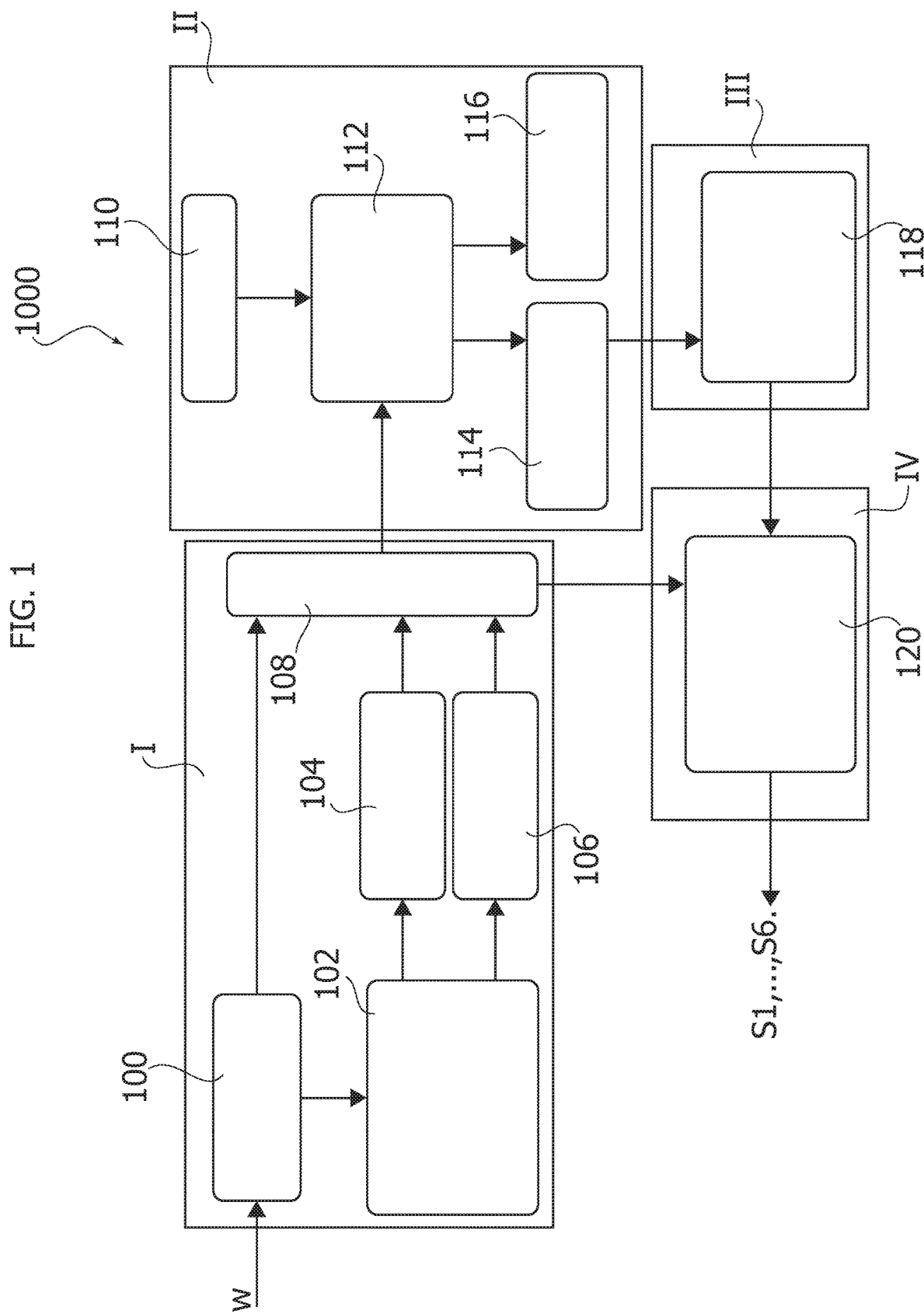
FIG. 1 is a block diagram exemplary of a processing pipeline according to one or more embodiments.
Figure 2:
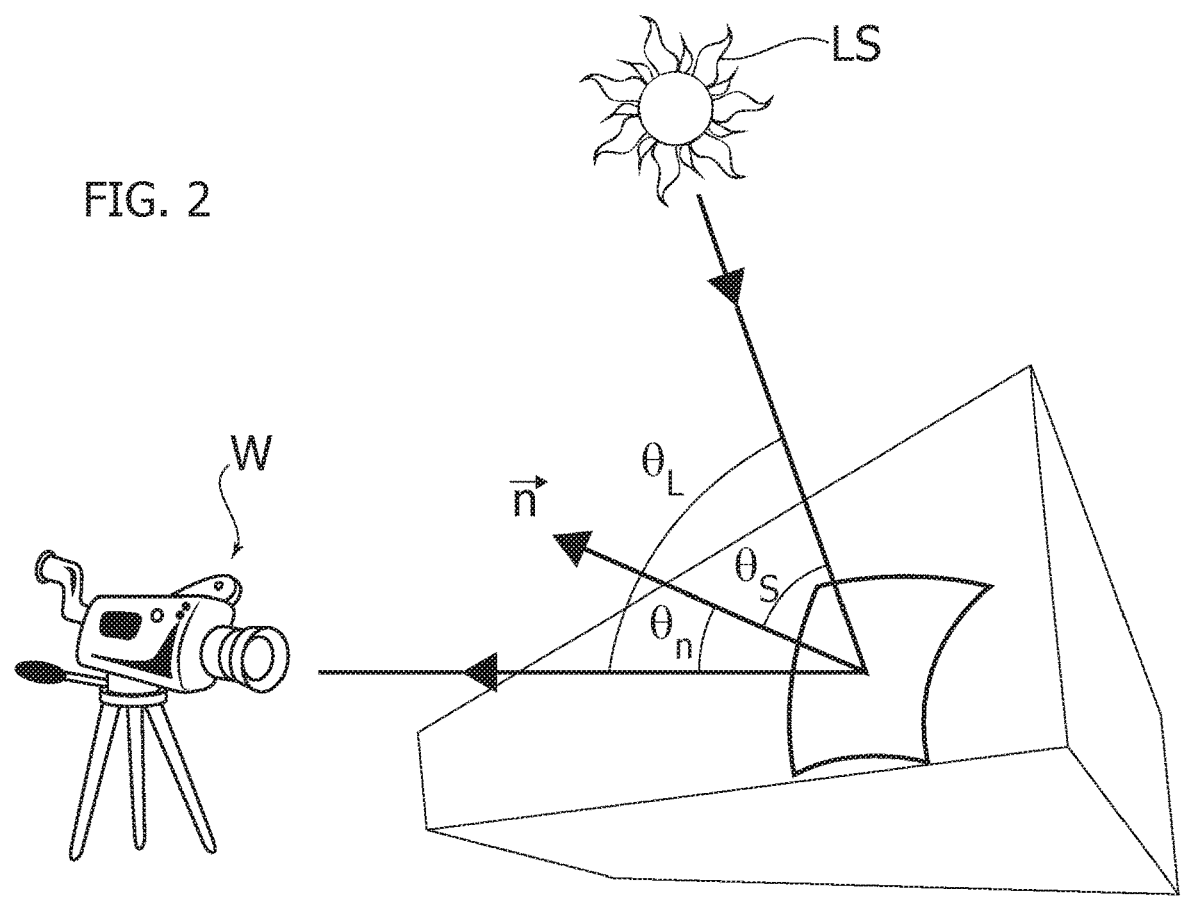
FIGS. 2 and 3 are exemplary of some principles underlying one or more embodiments, FIG. 4, including four portions indicated as a), b), c) and d), respectively, and FIG. 5 are exemplary of possible operation one or more embodiments.

In one or more embodiments, operation of such a system may be based on a procedure including four phases designated I, II, III, and IV, respectively, in FIG. 1.

One or more embodiments may include processing the input signal received in phase I at 1000 from the image sensor(s) W (e.g. RGB images), which may be possibly recorded and is representative of a certain scene in the environment observed by the "viewer" sensor(s) W.

Processing in the module 1000 may involve using image processing means/tools, e.g. a processing pipeline, which are per se conventional (see in that respect the introductory to this description), thus making it unnecessary to provide a detailed description herein.

For instance, such processing may include detecting shadows and specularities (at 102) to derive a shadow map 104 and a specular map 106. These may be combined with other information from the input image signal received at 100 to produce a "nearly Lambertian" image 108.

In one or more embodiments, such nearly-Lambertian image may be further processed in phase II along with image depth information 110 (e.g. the "D" information from a RGB-D camera W) to effect "intrinsic" image decomposition at 112 resulting in a shading map 114 and a reflectance map 116.

In one or more embodiments, information output from phase II may be processed in phase III e.g. via a linear dimensionality reduction (LDR) procedure 118.

In one or more embodiments, in phase IV information related to the nearly Lambertian image obtained in phase I and the result of LDR decomposition in phase III are processed by applying thereto a light identification and localization procedure 120 which may be exploited in managing the lighting devices S1, . . . , S6.

One or more embodiments may thus involve application to the time-lapse data (e.g. the input RGB-D image signal) the following processing actions:
  a) creating a nearly Lambertian sequence by extracting a specular and shadow map,
  b) applying an intrinsic decomposition to the Lambertian sequence with extraction of the illuminant component (e.g. shading),
  c) passing the extracted illuminant component on to a LDR procedure and extracting light source identification information, and
  d) using the information previously obtained in combination with the geometry information from the depth sensor in order estimate and manage the lighting conditions.

One or more embodiments may propose e.g. improved solutions for steps a, b and c) by the LDR decomposition of time lapse sequence.

By way of example, one may consider a long-term observation of a certain scene (e.g. an indoor environment) in a set of frames T, where different illumination conditions are present (e.g. dawn, morning, day, night) with different materials and reflection properties appearing in the scene observed. In one or more embodiments, creating a nearly Lambertian image may involve making use of a Lambertian model wherein the brightness of a surface appears the same regardless of the observer's angle of view, namely with reflection being essentially isotropic.

In such a model, image brightness I may be expressed as a function of the source brightness k, the angle $\theta_s$ under which this impinges on the surface S, as expressed by $\cos \theta_s$ and the surface reflectance $\rho$ (with $\rho=1$ in the ideal case):

$$I = \rho \cdot k \cdot \cos \theta_s = k \cdot \vec{n} \cdot \vec{s}$$

where $\vec{n}$ (in point line in FIG. 3) denotes the normal to the surface S and $\vec{s}$ is the direction to the light source.

Figure 3:
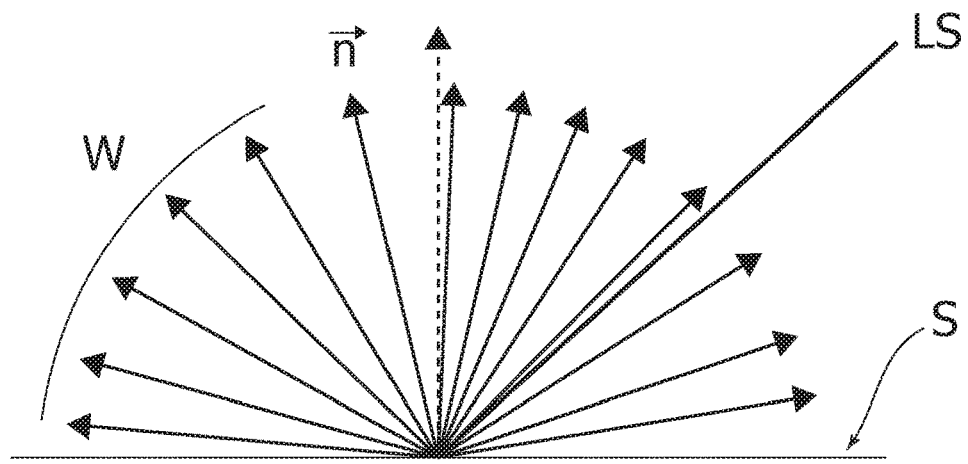

These entities are exemplified in FIG. 3 where LS is exemplary of possible positions of the light source and W is exemplary of possible positions of the viewer (e.g. a camera).

A near Lambertian image is thus an image where shadows and specular highlights are attenuated and the surfaces look substantially opaque or mat.

The diffused component of the scene may be extracted by known means, e.g. by means of the procedure (algorithm) presented in [27]. There, use is made of a bilateral filter, meaning that the intensity value at each pixel of an image is replaced by a weighted average of intensity values from nearby pixels, for the removal of the highlights and the extraction of the diffuse component.

Of course, while a procedure/algorithm as presented in [27] has been referred to here by way of example, in one or more embodiments the solutions disclosed e.g. in [28], [31] and [32] or other works may be used for the same purpose.

Once a (nearly) Lambertian appearance of the long-term captured frames is achieved, one or more embodiments may proceed with reflectance and shading decomposition processing.

In one or more embodiments this may involve intrinsic image decomposition processing (block 112).

For instance, in an image $I_{(p,t)}$, $t \in 1, \ldots, T$ the intensity of a pixel p at a frame t can be expressed as $$I_{(p,t)} = R_{(p)} S_{(p,t)}$$

where $R_{(p)}$ is the reflectance component which describes the reflection information (e.g. color of the material in the scene) and $S_{(p,t)}$ is the shading information which describes the illuminant information (i.e. light, shadows) of the scene.

One or more embodiments may decompose the input image sequence into one reflectance image and into a plurality of T shading images and use the latter for light source localization, identification and illuminant estimation.

In one or more embodiments, intrinsic image decomposition processing may be performed based on the approach presented in [19].

In one or more embodiments, the surface normal information may be computed from the input depth information obtained from a depth sensor (e.g. an RGB-D camera) and used to calculate the spherical harmonics (SH) coefficient for each pixel.

Spherical harmonics are a series of "modes" or "eigenvectors" or "orthogonal components" of a base that spans the surface of a sphere.

To put it simply, spherical harmonics describe the surface of a sphere in increasingly finer-grained partitions.

Much like a Fourier decomposition does to a function, these represent the base and the coefficients that, when multiplied over the base, lead to recovering the function.

Spherical harmonics have been used mostly to model lighting of spherical objects. By knowing the coefficients that describe lighting, on may can change them to Re-light an object, or De-light, or transfer the lighting conditions of one scene to another.

In one or more embodiments spherical harmonics may represent a suitable complete functional base, to which the distribution of the light sources can be projected or decomposed. The projection coefficients are the called the component values, with the (complete) set of the SH-coefficents also describing the prevailing light distribution.

For instance, in one or more embodiments, an input RGB image may be segmented in order to extract super-pixel and edge-pixel areas. Then the super-pixel reflectance areas may be solved by using a non-linear optimization method with the global SH lighting extracted. Once the SH lighting is recovered, each super-pixel area may be refined iteratively by removing a smooth SH color shading from the original input image. Then, the extracted super-pixel shading and SH lighting may be used to solve edge pixels in a similar way, where reference is made to an optimization solving problem for the super-pixel reflectance and SH light extraction e.g. based on the solution described in [19].

Again, while a procedure/algorithm as presented in [19] has been referred to here by way of example, in one or more embodiments intrinsic image decomposition as described e.g. in [22] or in other works may be adopted for the same purpose.

As indicated, in one or more embodiments, phases I and II in FIG. 1 may involve on a nearly Lambertian output (namely an output without specular and shadow components, with all surfaces appearing mat) which, after applying (e.g. at 112) an intrinsic image decomposition procedure, may permit to extract the reflectance and shading information of the scene.

In one or more embodiments, shading information may be (more) significant as it contains the illuminant information.

In one or more embodiments, once the illuminant conditions of the time lapse sequence have been extracted into the shading images, the number of light sources in the scene can be identified by applying e.g. an LDR procedure.

In one or more embodiments, LDR may involve non-negative matrix factorization (NMF) as disclosed e.g. in [34].

This approach may be advantageous due to its ability to extract sparse, localized and easily interpretable features by assuming additivity/linearity and imposing non-negativity of the base element, as light is in the present exemplary case: in fact light linearity adds while lighting cannot be negative, which may be usefully exploited in one or more embodiments.

NMF may be generally formulated as a non-negative least squares optimization problem, meaning that it is a constrained approach of the least squares where the coefficients though are not allowed to obtain negative values. In the case of light decomposition the latter can be summarized as:

given a m×n non-negative matrix M which in this case is the sequence of images with different illumination conditions and a positive integer (rank number) $1 \leq r \leq \min(m,n)$ which corresponds to the number of light components to be extracted, find two non-negative matrices U and V of dimensions m×r and n×r minimizing the sum of the squared entries of $M-UV^T$:

$$\min_{U,V} \|M - UV^T\|_F^2, \text{ where } U \geq 0 \text{ and } V \geq 0$$

In the images resulting from such processing, multiple frames describing different illumination conditions through time may be reduced to just those describing the individual light sources.

In the ideal case where the number of additive components into which the algorithm should decompose the sequence is known beforehand, the input variable r to the non-negative matrix factorization algorithms described earlier would be equal to the number of the light sources.

However, if the target is an unsupervised learning solution this is not the case and this number is unknown. Therefore, an arbitrary number that corresponds to a reasonable amount of possible existing light sources in the scene (for instance, a small indoor environment may be well covered by 2-5 individual light sources) and it should be larger or equal to the actual number of individual light sources was used instead. This estimation is done by taking into account the information from the data itself, based on a cross validation approach or a similarly method.

For instance (just by way of example) such processing may permit to obtain from a complex scene (including objects, shadows and so on) extracted information were e.g. four or six light sources may be extracted from the time lapse sequence.

Light identification and localization may then occur by taking into account that the number of light sources i may be given e.g. based on a correlation coefficient matrix extracted by the matrix V and the linear dependence of each vector of weights to each other. For example if the coefficient vectors A, B have N scalar observations then the correlation coefficient of A and B can be defined as the Pearson distance:

$$\rho(A, B) = \frac{1}{N-1} \sum_{i=1}^{N} \left(\frac{\overline{A_i - \mu_A}}{\sigma_A}\right)\left(\frac{B_i - \mu_B}{\sigma_B}\right)$$

where $\mu_A$, $\mu_B$ and $\mu_A$, $\mu_B$ are the mean and standard deviation of A and B respectively.

The latter can be alternatively written in terms of the covariance cov(A,B) of A and B:

$$\rho(A, B) = \frac{cov(A, B)}{\sigma_A \sigma_B}$$

The correlation matrix, which actually corresponds to an affinity matrix, can be then used within a common used clustering algorithm (e.g. hierarchical clustering, fuzzy c-kmeans, spectral clustering, etc. . . . ) in order to apply the clustering of the components.

The bases from U showing similarity as well as weights from V that tend to be activated at the same time may be clustered together with the number of clusters corresponding to the estimated number of light sources.

Identification of the light sources at each time may then result from the minimum residual (represented as the Root Mean Square Error, RMSE) of the corresponding approximated reconstructed component $\hat{I}(i)=U_i V_i^T$ from e.g. a test image $I_{input}$ as exemplified e.g. in FIG. 6, as given by an error E:

$$RMSE \leftarrow \sqrt{E[(\hat{I}-I_{input})^2]}$$

Alternatively, the identification of the light sources can be done as a classification problem by using simple Least Squares approach, e.g. inverse pseudo, where the extracted light source information (as images) will be provided as a given known bases and the extracted weights/coefficients activations over the new input image(s) will correspond to the light source identifications.

Figure 4:
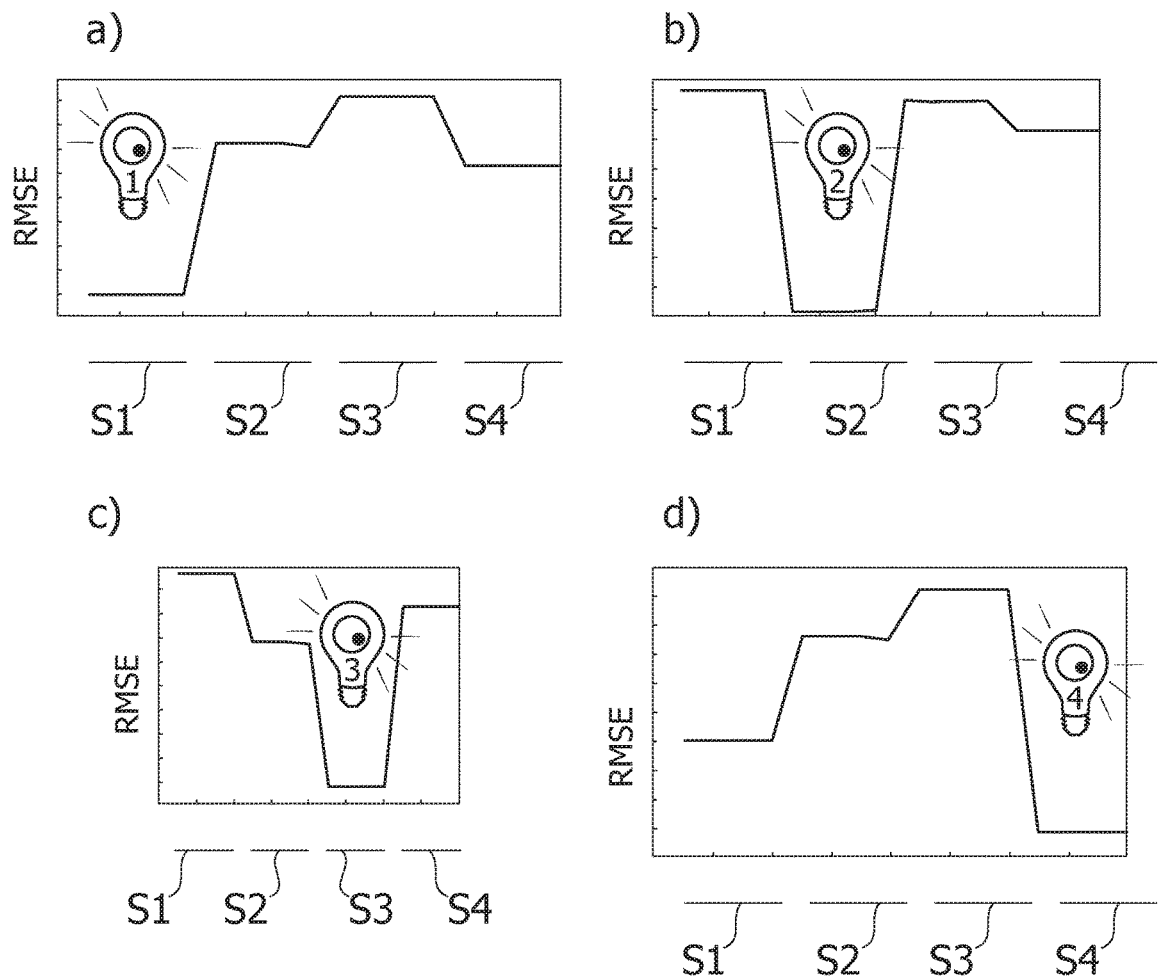

In portions a) to d) of FIG. 4, the abscissa is schematically indicative of four possible light sources S1, S2, S3, S4 with a corresponding root mean square error (RMSE) plotted in the ordinate.

In the diagrams of FIG. 4 low residual values identify respective different light source S1, S2, S3 or S4. More than one extracted component providing a minimum residual may be indicative of a multi-illuminant condition.

One or more embodiments may adopt variants of NMF such as the one known as non-negative matrix underapproximation (NMU) as disclosed in [35] (e.g. due to the advantage of extracting features in sequential form) or an extension of NMU known as PNMU as disclosed e.g. in [36] (which incorporates spatial and sparsity information/constraints). Consequently, both of these and other alternative options may be considered for use in one or more embodiments.

In one or more embodiments, the principles discussed in the foregoing may be applied e.g. in a system that analysis the light pattern in a scene (e.g. in an indoor environment) and provide information about the light sources active therein by using (only) images as obtained using e.g. a (standard) camera.

In one or more embodiments, these light sources can be both natural (e.g. sunlight from a window) and artificial, thus providing a solution that can self-adapt to different environments.

In one or more embodiments, a system (see e.g. the module 1000) as exemplified in FIG. 5 may first receive and record images from e.g. one or more (e.g. digital) cameras W with prominent light variations (e.g. over long-term observations, such as over a night-and-day cycle).

In one or more embodiments, such a system may then decompose the image signal received into a set of base images depicting each light source alone. These images may be used in order to identify which light sources (including natural light sources) are active in each new image acquired by the system.

In one or more embodiments, an RGB-D camera (providing also depth information D) may be used as an image sensor W in a "smart" lighting system for automatic light source calibration and/or identification.

In one or more embodiments automatic light source calibration may occur through a long-term observation (a time lapse sequence of images) e.g. in an indoor environment, e.g. using NMF or a variant thereof.

In one or more embodiments, image light source calibration/separation, possibly combined with detection of the presence of a person in the scene (performed in manner known per se, e.g. via PIR sensors as in the case of certain conventional light management systems) may be used e.g. for switching off lights which are not affecting the scene given the position of the person(s) with respect to the scene.

For instance, in one or more embodiments, this may permit e.g. to switch-off (wholly or partly) a lighting system, thereby reducing power consumption in those areas which are not "seen" by the persons in the environment, so that no interest subsists of lighting these areas.

In one or more embodiments, the output of an RGB-D camera sensor may be used e.g. for automatic light source calibration and identification.

In one or more embodiments, the illuminant information extracted e.g. by an intrinsic decomposition procedure/algorithm e.g. by using linear dimensionality reduction method (NMF or variants thereof) may be used to estimate the number of light sources in a scene, possibly based on a long-term observation sequence of a scene (e.g. an indoor environment).

In one or more embodiments, such a sequence may then be used as a training input in order to determine the different lights within the scene.

In one or more embodiments this may be done in a fully automatic way by analyzing a time lapse image sequence of a scene. Similarly, light source identification may occur by creating a model which can estimate the number of light sources identified and match the currently active light sources of a given scene to those of the model, which these actions adapted to be performed on line in real time after a modeling/training phase.

FIG. 5 exemplifies a possible use of one or more embodiments, where a lighting system including a set of lighting devices, e.g. S1, . . . , S6 (of course this number is merely exemplary) may be configured in such a way to "follow" a person P within the framework of a smart lighting managing system which will be able to switch the various lights on/off e.g. as a function of i) information on the estimated light sources, and ii) the given position of the person or persons P within the framework of the scene.

It will be appreciated that the same designation is used for certain ones of the light sources in FIGS. 4 and 5. This is intended to highlight that, in one or more embodiments a "smart" lighting system as exemplified in FIG. 5 may in fact control operation of a set of lighting devices S1, . . . , S6 as a function the lighting sources identified/localized in the respective environment with the lighting sources identified possibly including both external sources (e.g. natural sources such as sunlight, Sx in FIG. 5) and one or more of the lighting devices S1, . . . , S6.

In one or more embodiments, the use of a camera sensor may be combined with computer vision analysis and jointly exploited in such a way that e.g. once the position of a person P in the scene is obtained (for instance from a camera-based presence detectors of an existing smart lighting system) the corresponding light sources that have been identified and localized, as discussed in the foregoing, may then be activated in order to affect the specific position of interest in the scene.

One or more embodiments may thus relate to a method of controlling a lighting system including a set of lighting devices (see e.g. S1, . . . , S6 in FIG. 5) for lighting an environment (e.g. an indoor environment), wherein the method may include:

receiving (see e.g. the block 100 in the architecture 1000 in FIG. 1) from at least one image sensor (e.g. a RGB-D camera W) an (e.g. digital) image signal including a sequence of images of said environment under different conditions of illumination and light reflection, processing (see e.g. steps 102 to 120 in FIG. 1) said image signal to provide a light source identification signal (see e.g. 120 in FIG. 1) representative of (natural and/or artificial) light sources affecting said environment (e.g. producing light in the environment), and controlling said set of lighting devices as a function of said light source identification signal (and, possibly of the presence and/or the activity of persons in the scene).

In one or more embodiments, processing said image signal may include estimating the number of light sources affecting said environment.

In one or more embodiments, processing said image signal may include identifying, optionally localizing, the light sources affecting said environment and/or their strength (power) affecting said environment, thus having e.g. the possibility of acquiring the strength of a prevailing luminaire as well.

In one or more embodiments, controlling said set of lighting devices may include selectively activating/deactivating lighting devices in said set, such as by detecting (e.g. via cameras/sensors) the presence of occupants (see e.g. P in FIG. 5) in said environment and selectively switching-off lighting devices covering (that is capable of illuminating) areas in said environment unobserved by said occupants and/or by adjusting the illumination strength of the lighting devices, optionally based on occupants' activities.

In one or more embodiments, processing said image signal may include:
extracting (e.g. 114) illumination conditions of said environment from said sequence of images to provide shading information,
identifying the number of said light sources affecting said environment by linear dimensionality reduction, LDR (e.g. 118), such as by one of non-negative matrix factorization, NMF, and non-negative matrix under approximation, NMU or PNMU.

In one or more embodiments, processing said image signal may include generating (e.g. 102, 104, 106) from said sequence of images a nearly Lambertian sequence wherein the brightness of surfaces (e.g. S) in said environment are independent of the angle of view.

One or more embodiments may include applying reflectance and shading decomposition (e.g. 112) to said nearly Lambertian sequence.

One or more embodiments may include applying said linear dimensional reduction, LDR to said nearly Lambertian sequence to which reflectance and shading decomposition (112) has been applied.

One or more embodiments may relate to a lighting system including a set of lighting devices for lighting an environment, the system including:
at least one image sensor for generating an image signal including a sequence of images of said environment under different conditions of illumination and light reflection,
a processing module coupled to said at least one image sensor, said processing module configured for receiving and processing said image signal and controlling said set of lighting devices according to the method of one or more embodiments.

One or more embodiments may relate to a computer program product, loadable in at least one processing module and including software code portions for performing the method of one or more embodiments.

LIST OF DOCUMENTS CITED

1. Alhajhamad, H., Sunar, M. S., Kolivand, H. In: Automatic Estimation of Illumination Features for Indoor Photorealistic Rendering in Augmented Reality. Springer International Publishing, Cham (2015) 541-554
2. Plopski, A., Mashita, T., Kiyokawa, K., Takemura, H.: Reectance and light source estimation for indoor ar applications. In: Virtual Reality (VR), 2014 iEEE, IEEE(2014) 103-104
3. Boom, B. J., Orts-Escolano, S., Ning, X. X., McDonagh, S., Sandilands, P., Fisher, R. B.: Interactive light source position estimation for augmented reality with an rgb-d camera. Computer Animation and Virtual Worlds (2015) n/a-n/a
4. Neverova, N., Muselet, D., Trémeau, A. In: Lighting Estimation in Indoor Environments from Low-Quality Images. Springer Berlin Heidelberg, Berlin, Heidelberg (2012) 380-389
5. Debevec, P.: Image-based lighting. In: ACM SIGGRAPH 2005 Courses. SIG-GRAPH '05, New York, N.Y., USA, ACM (2005)
6. Karsch, K., Hedau, V., Forsyth, D., Hoiem, D.: Rendering synthetic objects into legacy photographs. ACM Trans. Graph. 30(6) (December 2011) 157:1-157:12

7. Takai, T., Maki, A., Niinuma, K., Matsuyama, T.: Difference sphere: An approach to near light source estimation. Comput. Vis. Image Underst. 113(9) (September 2009) 966-978
8. Ogura, Y., Ikeda, T., De Sorbier, F., Saito, H. In: Illumination estimation and relighting using an RGB-D camera. Volume 2. SciTePress (2015) 305-312
9. Poulin, P., Fournier, A.: Lights from highlights and shadows. In: Proceedings of the 1992 Symposium on Interactive 3D Graphics. I3D '92, New York, N.Y., USA, ACM (1992) 31-38
10. Wang, Y., Samaras, D.: Estimation of multiple directional light sources for synthesis of augmented reality images. Graph. Models 65(4) (July 2003) 185-205
11. Hara, K., Nishino, K., Ikeuchi, K.: Light source position and reectance estimation from a single view without the distant illumination assumption. IEEE Transactions on Pattern Analysis and Machine Intelligence 27(4) (April 2005) 493-505
12. Lopez-Moreno, J., Hadap, S., Reinhard, E., Gutierrez, D.: Compositing images through light source detection. Computers & Graphics 34(6) (2010) 698-707 Graphics for Serious GamesComputer Graphics in Spain: a Selection of Papers from fCEIGg 2009 Selected Papers from the {SIGGRAPH} Asia Education Program.
13. Gijsenij, A., Gevers, T., van de Weijer, J.: Computational color constancy: Survey and experiments. IEEE Transactions on Image Processing 20(9) (September 2011) 2475-2489
14. Beigpour, S., Riess, C., van de Weijer, J., Angelopoulou, E.: Multi-illuminant estimation with conditional random fields. IEEE Transactions on Image Processing (TIP) 23(1) (January 2014) 83-96
15. Stutz, D.: Intrinsic images introduction and reading list, available at http://davidstutz.de/intrinsic-images-introduction-and-reading-list/ (accessed: February 2015)
16. Land, E. H., McCann, J. J.: Lightness and retinex theory. J. Opt. Soc. Am. 61(1) (January 1971) 1-11
17. Barron, J. T., Malik, J.: Intrinsic scene properties from a single rgb-d image. CVPR (2013)
18. Chen, Q., Koltun, V.: A simple model for intrinsic image decomposition with depth cues. In: 2013 IEEE International Conference on Computer Vision. (December 2013) 241-248
19. Shi, J., Dong, Y., Tong, X., Chen, Y.: E cient intrinsic image decomposition for rgbd images. In: Proceedings of the 21st ACM Symposium on Virtual Reality Software and Technology. VRST '15, New York, N.Y., USA, ACM (2015) 17-25
20. Barron, J. T., Malik, J.: Shape, illumination, and reflectance from shading. TPAMI (2015)
21. Laffont, P. Y., Bazin, J. C.: Intrinsic decomposition of image sequences from local temporal variations. In: Proceedings of the International Conference on Computer Vision (ICCV) (2015)
22. Meka, A., Zollhoefer, M., Richardt, C., Theobalt, C.: Live intrinsic video. ACM Transactions on Graphics (Proceedings SIGGRAPH) 35(4) (2016)
23. Bonneel, N., Sunkavalli, K., Tompkin, J., Sun, D., Paris, S., Pfister, H.: Interactive intrinsic video editing. ACM Transactions on Graphics (Proceedings of SIGGRAPH Asia 2014) 33(6) (2014)
24. Ye, G., Garces, E., Liu, Y., Dai, Q., Gutierrez, D.: Intrinsic video and applications. ACM Trans. Graph. 33(4) (July 2014) 80:1-80:11
25. Lellmann, J., Balzer, J., Rieder, A., Beyerer, J.: Shape from specular reection and optical flow. International Journal of Computer Vision 80(2) (2008) 226-241
26. Tan, R. T., Ikeuchi, K. In: Separating Reection Components of Textured Surfaces using a Single Image. Springer US, Boston, Mass. (2008) 353-384
27. Yang, Q., Wang, S., Ahuja, N.: Real-time specular highlight removal using bilateral filtering. In: Proceedings of the 11th European Conference on Computer Vision: Part IV. ECCV'10, Berlin, Heidelberg, Springer-Verlag (2010) 87-100
28. Shen, H. L., Zheng, Z. H.: Real-time highlight removal using intensity ratio. Appl. Opt. 52(19) (July 2013) 4483-4493
29. Kim, H., Jin, H., Hadap, S., Kweon, I.: Specular reflection separation using dark channel prior. In: Proceedings of the 2013 IEEE Conference on Computer Vision and Pattern Recognition. CVPR '13, Washington, D.C., USA, IEEE Computer Society (2013) 1460-1467
30. Akashi, Y., Okatani, T. In: Separation of Reection Components by Sparse Non-negative Matrix Factorization. Springer International Publishing, Cham (2015) 611-625
31. An, D., Suo, J., Ji, X., Wang, H., Dai, Q.: Fast and high quality highlight removal from a single image. CoRR abs/1512.00237 (2015)
32. Zhao, Y., Peng, Q., Xue, J., Kong, S. G.: Specular reection removal using local structural similarity and chromaticity consistency. In: Image Processing (ICIP), 2015 IEEE International Conference on. (September 2015) 3397-3401
33. PCO: Knowledge base: linearity. www.pco.de/fileadmin/user_upload/db/download/kb_linearity_20100727.pdf [Online; accessed 10 Jul. 2016].
34. Lee, D. D., Seung, H. S.: Learning the parts of objects by non-negative matrix factorization. Nature 401(6755) (1999) 788-791
35. Gillis, N., Glineur, F.: Using underapproximations for sparse nonnegative matrix factorization. Pattern Recogn. 43(4) (April 2010) 1676-1687
36. Casalino, G., Gillis, N.: Sequential dimensionality reduction for extracting localized features. CoRR abs/1505.06957 (2015)

Without prejudice to the underlying principles, the details and the embodiments may vary, even significantly, with respect to what has been described just by way of example, without departing from the extent of protection.

The extent of protection is defined by the annexed claims.

The invention claimed is:

1. A method of controlling a lighting system including a set of lighting devices for lighting an environment, the method including:
   receiving from at least one image sensor an image signal including a sequence of images of said environment under different conditions of illumination and light reflection,
   processing said image signal to provide a light source identification signal representative of light sources affecting said environment, and
   controlling said set of lighting devices as a function of said light source identification signal,
   wherein processing said image signal includes:
   extracting illumination conditions of said environment from said sequence of images to provide shading information, and identifying a number of said light sources affecting said environment by linear dimensionality reduction.

2. The method of claim 1, wherein identifying the number of said light sources affecting said environment includes estimating the number of light sources affecting said environment.

3. The method of claim 1, wherein processing said image signal includes identifying the light sources and/or the illumination strength of the light sources affecting said environment.

4. The method of claim 1, wherein controlling said set of lighting devices includes selectively activating/deactivating lighting devices in said set, and selectively switching-off lighting devices covering areas in said environment unobserved by occupants and/or by adjusting the illumination strength of the lighting devices.

5. The method of claim 1, wherein processing said image signal includes generating from said sequence of images a nearly Lambertian sequence wherein the brightness of surfaces in said environment are independent of the angle of view.

6. The method of claim 5, further including applying reflectance and shading decomposition to said nearly Lambertian sequence.

7. The method of claim 5, further including applying said linear dimensionality reduction to said nearly Lambertian sequence to which reflectance and shading decomposition has been applied.

8. A lighting system including a set of lighting devices for lighting an environment, the lighting system including:

at least one image sensor for generating an image signal including a sequence of images of said environment under different conditions of illumination and light reflection, one or more processors coupled to said at least one image sensor, said one or more processors configured to:

receive from the at least one image sensor the image signal including said sequence of images of said environment under different conditions of illumination and light reflection;

process said image signal to provide a light source identification signal representative of light sources affecting said environment, wherein processing said image signal includes extracting illumination conditions of said environment from said sequence of images to provide shading information and identifying a number of said light sources affecting said environment by linear dimensionality reduction; and control said set of lighting devices as a function of said light source identification signal.

9. A non-transitory computer readable medium having stored thereon software instructions that, when executed by a processor, perform the method of claim 1.

10. The lighting system of claim 8, wherein processing said image signal further includes:

generate from said sequence of images a nearly Lambertian sequence wherein the brightness of surfaces in said environment are independent of an angle of view, apply reflectance and shading decomposition to said nearly Lambertian sequence, and apply said linear dimensionality reduction to said nearly Lambertian sequence to which reflectance and shading decomposition has been applied.

* * * * *